Oct. 16, 1928.
L. ANDROFF
1,687,705
DISPENSING DEVICE
Filed Jan. 9, 1928
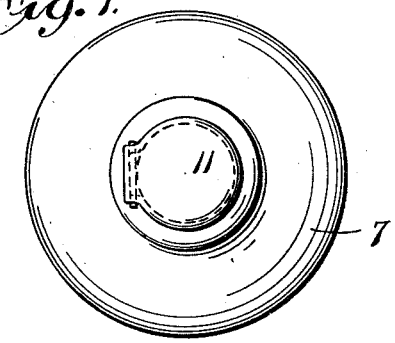
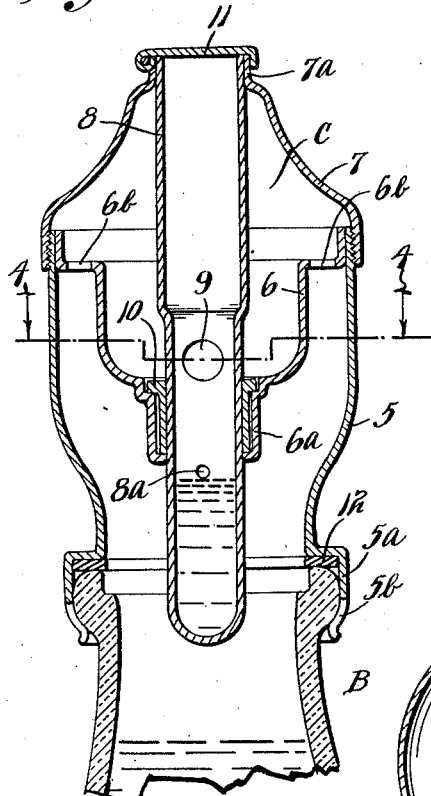
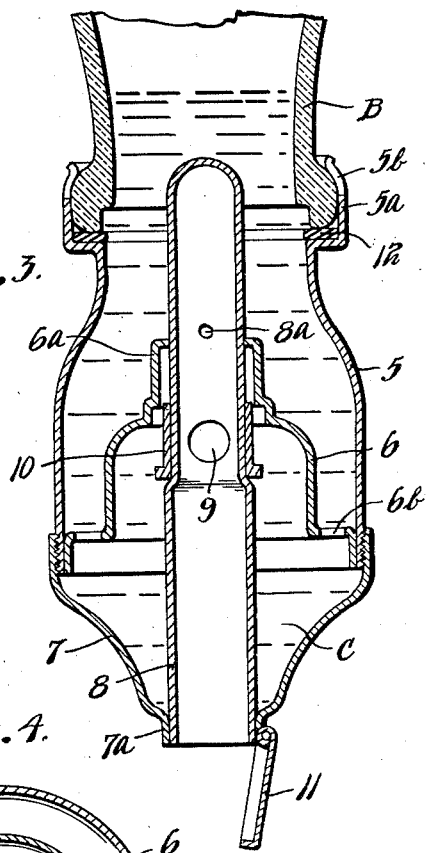
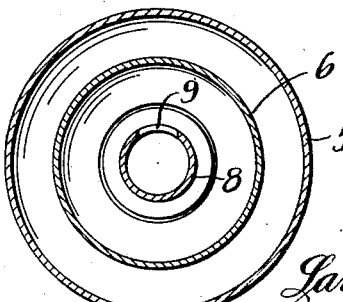
Inventor
Lambro Androff
By his Attorneys
Williamson Reif & Williamson Patented Oct. 16, 1928.

1,687,705

UNITED STATES PATENT OFFICE.

LAMBRO ANDROFF, OF MINNEAPOLIS, MINNESOTA.

DISPENSING DEVICE.

Application filed January 9, 1928. Serial No. 245,356.

This invention relates to dispensing devices and especially to devices for dispensing measured quantities of liquid or other material which will flow easily.

It is an object of my present invention to provide an extremely simple but highly efficient dispensing device capable of wide general use in connection with receptacles of various form which will by the tipping or tilting of the receptacle dispense a measured quantity of liquid or other material, said pouring or tilting causing a new charge of material to be placed within the measuring and dispensing chamber.

It is a further object of my invention to provide a dispensing device wherein the pouring of a definite quantity of material may be effected solely by gravity each time a receptacle is tilted.

A more specific object is to provide a device of the class above set forth wherein a reservoir or compartment is filled with material each time a receptacle is tilted and wherein when the receptacle is returned to upright position said reservoir is placed in communication with a measuring and dispensing chamber or well, the collected material from said reservoir filling said well to a predetermined capacity, said well being emptied upon the next pouring or tilting movement of said receptacle.

A still further object is to provide a device of the class above enumerated which will be easily adaptable as an attachment for the mouth of a bottle, pitcher or other receptacle to perform the functions above enumerated.

These and other objects and advantages of the invention will be apparent from the following description made in connection with the accompanying drawings wherein like reference characters refer to similar parts throughout the several views, and in which, Fig. 1 is a plan view of the upper end of an embodiment of my invention;

Fig. 2 is a vertical longitudinal section showing the device mounted on a milk bottle, said bottle being disposed in upright position;

Fig. 3 is a similar vertical section showing the bottle disposed in inverted position for dispensing; and Fig. 4 is a cross section taken on the line 4—4 of Fig. 3.

In the drawings, the upper portion of a milk bottle B is illustrated having the usual annular mouth to which is attached one embodiment of my improved dispensing device.

As shown, my dispenser includes a generally cylindrical open ended body 5 provided with means at its lower end, such as the inturned resilient flange $5^a$ for snugly fitting the outer periphery of the bottle mouth. Flange $5^a$ may be provided with a plurality of slots $5^b$ to permit of its being forced over the enlarged bulge around the bottle mouth.

Carried from the upper portion of body 5 is a depending cup 6 having a diminished lower end provided with a circular aperture therethrough. The brim or enlarged edge of cup 6 is snugly seated or rigidly connected with the upper end of body 5, preferably fitting therewithin.

The open upper end of body 5 is covered by an upstanding cap member 7 which may have interiorly threaded engagement with the upper portion of body 5 and which is provided at its upper extremity with an annular flange $7^a$ in which the upper end of my measuring and dispensing well 8 is snugly seated. The upper end of said well may be rigidly secured within said flange as desired. Dispensing well 8 projects downwardly for a considerable distance, has a closed lower end, and a restricted lower portion and is provided intermediately and adjacent the lower portion of cup 6 with one or more inlet ports 9 communicating with said cup. Well 8 passes through the lower and restricted extremity $6^a$ of cup 6 and preferably liquid tight engagement is made between said parts.

A longitudinally slidable sleeve valve 10 surrounds the diminished portion of well 8, limited in its downward movement by the slightly inturned extremities of cup 6 and limited in its opposite movement by the shoulders afforded by the enlarged portion of well 8. Obviously, when the receptacle B is disposed in the position shown in Fig. 2 sleeve valve 10 will be disposed below the intake port 9 putting cup 6 in communication with the interior of well 8. When the receptacle is tilted or inverted as shown in Fig. 3, the ring or sleeve valve 10 will slip downwardly by gravity into the position shown in Fig. 3, covering intake opening 9 and shutting off communication between well 8 and cup 6. Cup 6 is provided adjacent its upper end with a plurality of ports $6^b$, said ports connecting the interior of body 5 with the compartment C formed between the cap 7 and cup 6.

As shown, the upper and restricted end of cap 7 may be provided with a lid 11 adapted to cover the upper end of my dispensing well.

In the drawings well 8 is illustrated as being provided with a relatively small overflow port 8ª disposed below cup 6 and adapted to permit discharge of material from said well until the level therein has been reduced to a predetermined height.

The operation of my device may be briefly described as follows:—

Assuming the bottle or receptacle in normal upright position and containing a supply of liquid, the device may be quickly and easily attached by forcing the split flange 5ª over the enlarged mouth, the washer 12 being seated against the upper edge of the mouth of the bottle to make a liquid tight joint between the bottle and the body 5. The bottle may then be tilted or inverted, as shown in Fig. 3 causing the liquid or material to flow through the ports 6ᵇ into the compartment or reservoir C and filling said compartment. At this time sleeve valve 10 will drop by gravity into closed position covering port 9 and preventing the liquid and the material from passing into the well 8. Upon returning the bottle to normal upright position liquid will promptly pass through port 9 into the lower portion of the well filling said well to a height above the overflow port 8ª. The excess of liquid in well 8 will quickly be delivered back to the bottle B through said port, leaving a measured charge of liquid within the lower portion of the well. Upon again tilting or pouring from the bottle the charge of liquid shown in Fig. 2 will be quickly dispensed through the open end of the well 8, the tilting of said bottle causing a new charge of liquid to fill the compartment C.

From the foregoing description it will be seen that I have provided a very simple but efficient dispensing device depending entirely upon gravity for its operation and operative to dispense a measured amount of liquid or other material each time the receptacle whereon it is applied is tilted or inverted.

It will, of course, be understood that various changes may be made in the form, details, arrangement and proportions of the parts without departing from the scope of the invention, and in this connection I contemplate in some devices where more exact measurement of liquid is required employing a second sleeve valve of similar construction to my valve 10, said valve being slidably disposed upon the lower end of my measuring well in position to close the overflow port 8ª when the receptacle is tilted or inverted.

What is claimed is:

1. A dispensing device comprising a receptacle, a charging chamber disposed adjacent the upper end of said receptacle and having communication with said receptacle when the latter is tilted or inverted, a dispensing well having an outlet passage adjacent the upper end thereof, means for causing said well to communicate with said charging chamber when said receptacle is disposed top upwards and means for shutting off communication between said charging chamber and said well when said receptacle is tilted or inverted.

2. In a device for dispensing measured quantities of material, a receptacle, a casing having communication at its lower end with said receptacle, a charging chamber in said casing having communication with said receptacle when the latter is tilted or inverted, a dispensing well adapted to contain a predetermined amount of material, said well having communication with said charging chamber when said receptacle is supported top upwards and having an outlet passage at its upper end, and means for shutting off communication between said dispensing well and said charging chamber when said receptacle is tilted or inverted.

3. In a device for dispensing measured quantities of material, a receptacle, a casing having communication at its lower end with the upper portion of said receptacle, a charging chamber in said casing having a closed upper end and having communication with said receptacle when the latter is tilted or inverted, a dispensing well extending through said charging chamber and having an outlet passage at its upper end and having communication with the lower portion of said chamber when said receptacle is supported top upwards, and a gravity operated valve adapted to cut off communication between said end and said chamber when said receptacle is tilted or inverted.

4. In a device for dispensing measured quantities of material, a receptacle, a casing having communication at its lower end with said receptacle, a charging chamber having a closed depending portion and communicating at its upper portion with said casing, a dispensing well extending through said chamber having an outlet passage at its upper end and having communication with the lower portion of said chamber when said receptacle is supported top upwards, means for shutting off communication between said dispensing well and said charging chamber when said receptacle is tilted or inverted, and means for returning an excess of material in said well above a predetermined amount to said receptacle when said receptacle is returned to normal upright position.

5. In a device for dispensing measured quantities of material, a receptacle, a casing having communication at its lower end with said receptacle, a cup-shaped partition in said casing dividing the space therewithin into an upper charging chamber and a lower intake chamber, a passage through the upper portion of said cup-shaped partition, a dispensing well concentrically disposed relatively to said casing and said cup-shaped partition and passing through said partition adjacent its lower portion, said dispensing well having an outlet passage at its upper end and a port communicating with the lower portion of said charging chamber when said receptacle is disposed top upwards, and a sleeve valve surrounding the intermediate portion of said well and adapted to slide longitudinally over said port to close off communication between said well and said charging chamber when said receptacle is tilted or inverted.

6. In a device for dispensing measured quantities of material, a receptacle, an open bottomed casing adapted to be detachably connected with the mouth of said receptacle, a charging chamber in the upper portion of said casing having communication with the open portion of said casing when said receptacle is tilted or inverted, and a dispensing well having an outlet passage at its upper end and having communication with said charging chamber when said receptacle is in top upwards position, and means for shutting off communication between said well and said charging chamber when said receptacle is tilted or inverted.

In testimony whereof I affix my signature.

LAMBRO ANDROFF.